United States Patent
Erdelyi et al.

(10) Patent No.: US 9,910,819 B2
(45) Date of Patent: Mar. 6, 2018

(54) TWO-WIRE SERIAL INTERFACE AND PROTOCOL

(71) Applicant: Microchip Technology Incorporated, Chandler, AZ (US)

(72) Inventors: Janos Erdelyi, Dunakeszi (HU); Steven Bible, Chandler, AZ (US); Phil Li, San Jose, CA (US); Peter Kovacs, San Jose, CA (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 239 days.

(21) Appl. No.: 14/197,330

(22) Filed: Mar. 5, 2014

(65) Prior Publication Data

US 2014/0258574 A1 Sep. 11, 2014

Related U.S. Application Data

(60) Provisional application No. 61/776,451, filed on Mar. 11, 2013.

(51) Int. Cl.
| | |
|---|---|
| *G06F 13/00* | (2006.01) |
| *G06F 13/42* | (2006.01) |
| *G06F 1/00* | (2006.01) |
| *G06F 1/04* | (2006.01) |
| *G06F 1/12* | (2006.01) |
| *G06F 5/06* | (2006.01) |

(52) U.S. Cl.
CPC ...... *G06F 13/4295* (2013.01); *G06F 13/4291* (2013.01)

(58) Field of Classification Search
CPC ............. G06F 13/4295; G06F 13/4068; G06F 13/4291; G06F 1/3203; G06F 1/3253; G06F 13/4282; G06F 1/325; G06F 1/3287; G06F 1/3296; G06F 2213/0016
USPC ........ 710/106, 110; 713/300, 324, 600, 310, 713/323
See application file for complete search history.

(56) References Cited

U.S. PATENT DOCUMENTS

| | | | | | |
|---|---|---|---|---|---|
| 4,933,845 | A | * | 6/1990 | Hayes | G06F 15/177 710/104 |
| 5,003,201 | A | * | 3/1991 | Bai | H03K 5/15033 326/105 |
| 5,339,395 | A | * | 8/1994 | Pickett | G06F 13/385 370/463 |

(Continued)

FOREIGN PATENT DOCUMENTS

DE 19926006 A1 12/2000 ............... H04B 3/54

OTHER PUBLICATIONS

International Search Report and Written Opinion, Application No. PCT/US2014/021294, 10 pages, dated Jun. 13, 2014.

(Continued)

*Primary Examiner* — Faisal M Zaman
(74) *Attorney, Agent, or Firm* — Slayden Grubert Beard PLLC (57) ABSTRACT

In a serial transmission method using a two-wire serial interface, a master device transmits a first synchronous serial signal via the two-wire serial interface to wake-up a slave device followed by an asynchronous data transmission on one of the two-wires of the two-wire serial interface. The asynchronous data signal directly controls a function of the slave device.

29 Claims, 4 Drawing Sheets

(56) References Cited

U.S. PATENT DOCUMENTS

| | | | | |
|---|---|---|---|---|
| 5,577,067 A * | 11/1996 | Zimmerman | G06F 11/2294 | 375/224 |
| 5,590,369 A * | 12/1996 | Burgess | G06F 13/423 | 710/105 |
| 5,592,685 A * | 1/1997 | Pawlowski | G06F 13/405 | 710/62 |
| 5,761,516 A * | 6/1998 | Rostoker | G06F 9/4812 | 709/201 |
| 5,764,907 A * | 6/1998 | Hurley | G06F 13/4027 | 365/221 |
| 5,896,341 A * | 4/1999 | Takahashi | G11C 8/06 | 365/230.02 |
| 6,510,484 B1 * | 1/2003 | Kim | G06F 13/4291 | 710/110 |
| 6,513,085 B1 * | 1/2003 | Gugel | H04L 12/40123 | 370/438 |
| 6,772,251 B1 * | 8/2004 | Hastings | G06F 13/4291 | 375/354 |
| 6,963,736 B2 * | 11/2005 | Tahtinen | H04H 20/42 | 348/E5.108 |
| 7,099,970 B1 * | 8/2006 | Foegelle | G06F 13/38 | 710/110 |
| 7,359,433 B1 * | 4/2008 | Culca | H04L 5/14 | 375/220 |
| 2003/0014766 A1 * | 1/2003 | Dinwiddie | H04N 7/104 | 725/126 |
| 2004/0093533 A1 * | 5/2004 | Chapuis | H02J 1/08 | 714/22 |
| 2004/0203443 A1 * | 10/2004 | Woolf | H04B 10/43 | 455/67.11 |
| 2004/0208200 A1 * | 10/2004 | Hejdeman | H04L 7/044 | 370/476 |
| 2005/0100114 A1 | 5/2005 | Satagopan et al. | | 375/295 |
| 2007/0073956 A1 * | 3/2007 | Goma | G06F 1/3203 | 710/310 |
| 2007/0126553 A1 * | 6/2007 | Park | H04B 5/0056 | 340/10.1 |
| 2008/0002735 A1 * | 1/2008 | Poirier | H04L 12/403 | 370/445 |
| 2008/0079592 A1 * | 4/2008 | Latinis | G01R 19/16542 | 340/636.15 |
| 2008/0292037 A1 * | 11/2008 | Fujita | H04B 1/40 | 375/354 |
| 2008/0320239 A1 * | 12/2008 | Hou | G06F 13/4295 | 711/148 |
| 2009/0024781 A1 * | 1/2009 | Heizmann | G06F 1/10 | 710/305 |
| 2009/0031060 A1 * | 1/2009 | Adachi | G06F 13/4054 | 710/61 |
| 2009/0292840 A1 * | 11/2009 | Konnail | G06F 1/3203 | 710/61 |
| 2010/0054313 A1 * | 3/2010 | Chu | G06F 13/4291 | 375/220 |
| 2010/0185841 A1 * | 7/2010 | Monreal | G06F 13/4068 | 713/2 |
| 2012/0030388 A1 * | 2/2012 | Bas | G06F 13/4027 | 710/106 |
| 2013/0019039 A1 * | 1/2013 | Herklots | H04J 3/0602 | 710/105 |

OTHER PUBLICATIONS

European Office Action, Application No. 14713334.2, 3 pages, dated Jun. 7, 2017.

Chinese Office Action, Application No. 201480010094.9, 28 pages, dated Jun. 2, 2017.

* cited by examiner

TWO-WIRE SERIAL INTERFACE AND PROTOCOL

CROSS-REFERENCE TO RELATED APPLICATIONS

This application claims the benefit of U.S. Provisional Application No. 61/776,451 filed on Mar. 11, 2013, which is incorporated herein in its entirety.

TECHNICAL FIELD

The present disclosure relates to a two-wire serial interface and protocol, in particular for device control and configuration.

BACKGROUND

Serial interfaces using either a synchronous or asynchronous protocol are well known in the art. For example, an $I^2C$ interface bus uses two bus lines to separately transmit a clock signal and associated data signals. These type of interfaces are synchronous because the data is transmitted synchronous to the clock signal. Generally, such interfaces are more robust than asynchronous interfaces and allow for higher transmission rates. Asynchronous interface usually only use a single line for data transmission wherein the clock signal can be derived from the transmitted signal. A plurality of different protocols and implementations of such serial interfaces exists.

SUMMARY

According to an embodiment, a serial transmission method using a two-wire serial interface comprises: transmitting by a master device a first synchronous serial signal via the two-wire serial interface to wake-up a slave device followed by an asynchronous data transmission on one of the two-wires of the two-wire serial interface, wherein the asynchronous data signal directly controls a function of the slave device.

According to a further embodiment, the synchronous serial signal may comprise configuration data for the slave device. According to a further embodiment, the synchronous serial signal may comprise a calibration request. According to a further embodiment, the slave device can be a radio frequency transmitter. According to a further embodiment, the transmitter may be an on-off-key (OOK) radio frequency transmitter. According to a further embodiment, the asynchronous data signal may turn the transmitter on or off, respectively according to its logic state. According to a further embodiment, a communication via the two-wire serial interface may comprise a start pattern followed by the asynchronous data transmission followed by a stop pattern. According to a further embodiment, the communication may further comprise a wake-up wait period. According to a further embodiment, the communication further may comprise a configuration bit within the synchronous signal. According to a further embodiment, when the configuration bit is set the communication may comprise synchronous configuration data. According to a further embodiment, the communication may further comprise a calibration bit within the synchronous signal. According to a further embodiment, when the calibration bit is set the slave device may perform a calibration.

According to another embodiment, a system may comprise a master device and a slave device coupled through a two-wire serial interface comprising a signal line and a clock line, wherein the master device controls the slave device by transmitting a first synchronous serial signal via the two-wire serial interface to wake-up the slave device followed by an asynchronous data transmission on one of the two-wires of the two-wire serial interface, wherein the asynchronous data signal directly controls a function of the slave device.

According to a further embodiment of the system, the slave device can be an on-off-key (OOK) radio frequency transmitter, wherein an asynchronous data signal of the asynchronous data transmission turns the transmitter on or off, respectively according to its logic state. According to a further embodiment of the system, a communication via the two-wire serial interface may comprise a start pattern followed by the asynchronous data transmission followed by a stop pattern. According to a further embodiment of the system, the communication may further comprise a wake-up wait period. According to a further embodiment of the system, the communication may further comprise a configuration bit within the synchronous signal. According to a further embodiment of the system, when the configuration bit is set the communication may comprise synchronous configuration data. According to a further embodiment of the system, the communication may further comprise a calibration bit within the synchronous signal. According to a further embodiment of the system, when the calibration bit is set the slave device may perform a calibration.

According to yet another embodiment, an integrated circuit device may comprise a two wire serial interface, a control unit coupled with the two-wire serial interface, and a functional unit controlled by the control unit, wherein the control unit is operable to receive a first synchronous serial signal via the two-wire serial interface to wake-up the integrated circuit device followed by an asynchronous data transmission on one of the two-wires of the two-wire serial interface, wherein the asynchronous data signal directly controls the functional unit of the integrated circuit device.

According to a further embodiment of the integrated circuit device, the integrated circuit device can be an on-off-key (OOK) radio frequency transmitter, wherein an asynchronous data signal of the asynchronous data transmission turns the transmitter on or off, respectively according to its logic state. According to a further embodiment of the integrated circuit device, a communication received via the two-wire serial interface may comprise a start pattern followed by the asynchronous data transmission followed by a stop pattern. According to a further embodiment of the integrated circuit device, the communication may further comprise a wake-up wait period during which the operational units of integrated circuit device are woken up from a sleep mode by the control unit. According to a further embodiment of the integrated circuit device, the communication may further comprise a configuration bit within the synchronous signal. According to a further embodiment of the integrated circuit device, when the configuration bit is set the communication may comprise synchronous configuration data. According to a further embodiment of the integrated circuit device, the communication may further comprise a calibration bit within the synchronous signal. According to a further embodiment of the integrated circuit device, when the calibration bit is set the integrated circuit device may perform a calibration. According to a further embodiment of the integrated circuit device, the IC device can be arranged within a 6-pin housing.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

According to various embodiments, a two-wire serial interface and protocol is proposed that allows for device control and configuration and data transmission with arbitrary data rates. The two-wire serial interface may preferably be uni-directional, however, according to other embodiments, the interface may also be bi-directional.

Such an interface is particularly desirable for an integrated circuit device that comprises an On-OFF-Key (OOK) type radio frequency (RF) transmitters. However, such an interface can also be implemented in any other suitable device. OOK transmitters operate by simply turning a stabilized oscillator or a buffer amplifier coupled with the output of the oscillator on and off synchronous with the data to be transmitted. This type of modulation is in particular desirable in devices that are battery operated as it provides for a significant reduction in battery current drain in comparison with other modulation techniques. Such transmitters typically operate in a sub GHz frequency range and the interface may be designed to operate only uni-directional, i.e. in direction of the transmitter.

According to an embodiment, a device interface should have the ability to control an RF transmitter with a single master, single slave one directional serial protocol which uses a minimum number of wires, provides slave device operating mode control, parameter reconfiguration and an asynchronous data transfer and does not rely on a priori knowledge of data rate and time-outs.

According to various embodiments, a two wire serial interface is proposed which consists of one clock line and one data line, with the ability to transfer data in a synchronous manner and control the transmitter on/off function asynchronously. To this end, separate data and clock lines are used to allow synchronous transfer of control and configuration bits according to a synchronous protocol. For example, according to one embodiment, similar to an $I^2C$ interface but not limited to such a protocol, both lines idle high by default and the data changes only when the clock is low. This allows for defining start and stop patterns (data high-to-low or low-to-high transition, while the clock is high). No addressing is used according to some embodiments, as the interface may be designed to only operates uni-directional, using a single-master and single-slave protocol according to one embodiment. However, other synchronous protocols, for example, protocols including an address, may be used and the interface may also operate bi-directional.

After a start pattern, a fixed number of control bits define the operating mode of the slave and the number of configuration bits to follow. According to some embodiments, counting, the clocks, may determine the end of the configuration. According to some embodiments, this can be used as another operating mode change, for example, control the transmitter on/off function in an asynchronous fashion. Afterwards the clock stays low and any number of data bits can now be sent asynchronously on the data line, with arbitrary data rate until a stop pattern is sent. Thus, according to various embodiments, synchronous and asynchronous data transfer is combined in a serial protocol.

When implemented in an OOK-transmitter device, the asynchronous data may have an arbitrary data rate because it is simply used to turn the transmitter function on or off according to the logic state. Thus, a stabilized oscillator or an amplifier connected with the output of the oscillator can be simply turned on and off by this signal. No decoding is necessary within the device as this is the actual transmission signal.

Figure 3:
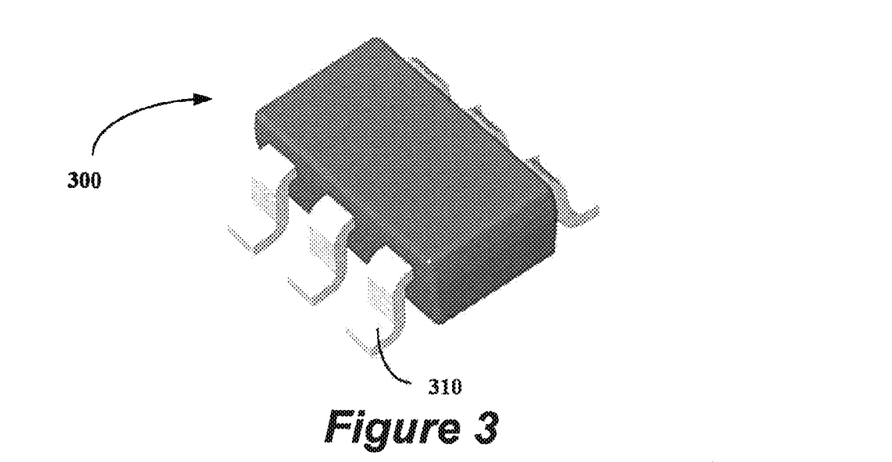
FIG. 3 shows a three-dimensional drawing of device according to various embodiments.

According to an embodiment, a sub-GHz OOK RF transmitter, which is a slave for a master device, requires low cost, low power consumption, along with small package size. To achieve low cost and small package size, the transmitter needs to have low pin counts. FIG. 3 shows a possible housing for such a transmitter according to some embodiments. FIG. 3 shows a SOT23 package 300 with 6 pins 310. However, other packages may be used such as no-lead packages, ball grid packages, DIL packages, etc. The pins 310 in particular of a low pin count package 300 as shown in FIG. 3 can be used for a supply voltage VDD, VSS, an oscillator input OSC, a radio frequency output RFO, and two pins for the serial interface, a clock pin SCK, and a data pin SDI according to various embodiments as described herein.

Figure 4:
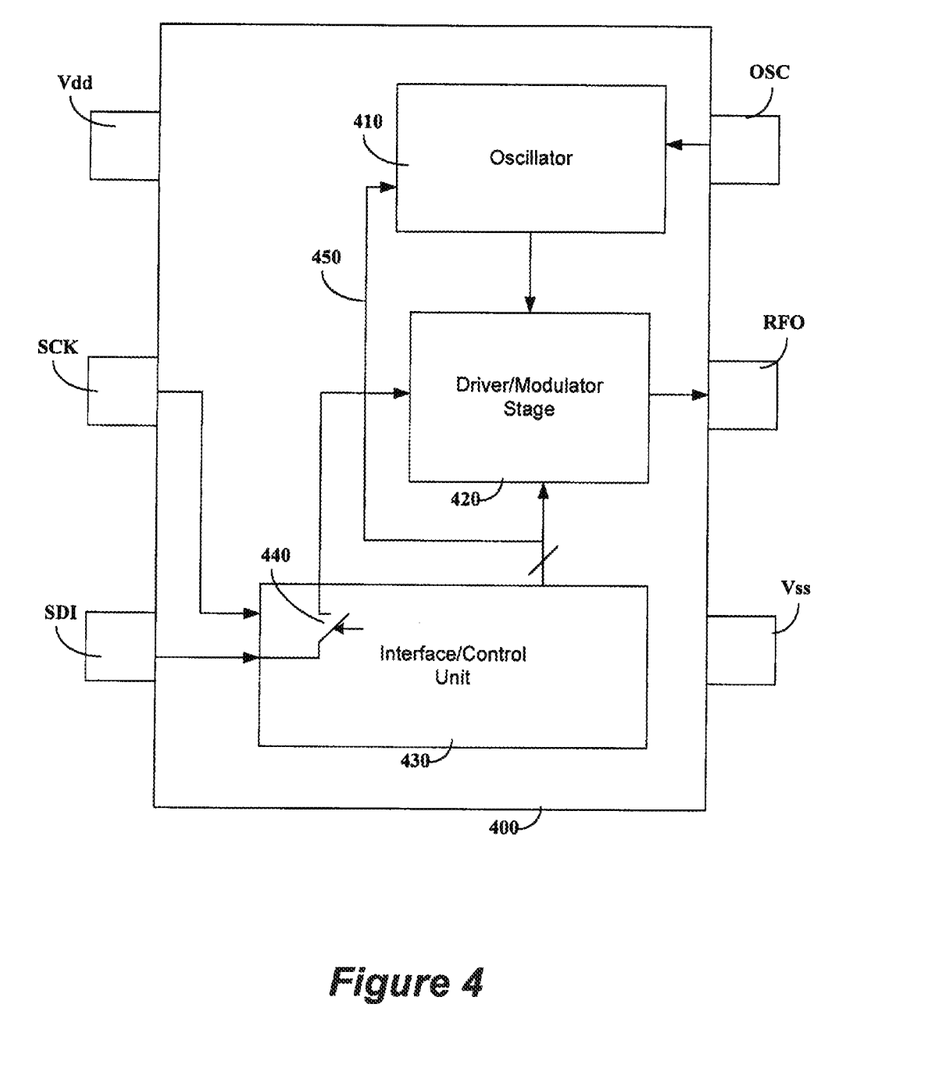
FIG. 4 shows a block diagram of a low pin device according to FIG. 3.

FIG. 4 shows an exemplary block diagram of a transmitter arranged in a low pin housing 400 with pins VDD, VSS, OSC, RFO, SCK, and SDI as mentioned with respect to FIG. 3. An internal oscillator circuit 410 receives the external oscillator signal OSC. In some embodiments, this signal may be directly supplied to a driver/modulator stage 420. In other embodiments, the oscillator circuit may further process the external signal, for example, oscillator circuit 410 may include a PLL or other processing circuitry. The interface/control unit 430 is operable to receive commands through the synchronous protocol provided by the two-wire serial interface. Thus, flags within the synchronous protocol can be set as explained in more detail below and configuration bits can be received which may be stored in respective configuration registers that control the function of various circuits within the device such as the oscillator and/or driver/modulator circuits. Other units such as voltage and current references as well as voltage regulators may be present.

Moreover, control unit 430 may include sleep/wake-up logic operational to put the device in and out of a sleep mode in which the device consumes significant less energy. To the end, the control unit 430 may have a minimum necessary circuitry operational all the time to be able to recognize a wake-up command, for example a start pattern received through the two-wire serial interface. All other units within the device may be designed to go into a sleep or low power mode under control of the control unit 430. Thus, the device may only be operational during a communication which may be defined by a transmission frame starting with a start pattern and ending with a stop pattern as will be explained in more detail below.

Figure 5:
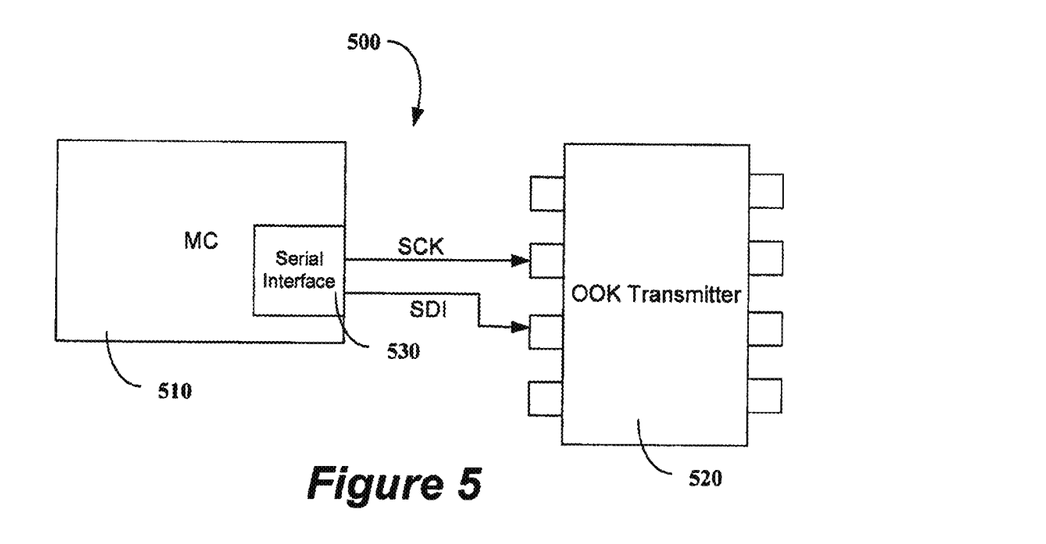
FIG. 5 shows a master device coupled with an OOK transmitter according to various embodiments.

FIG. 5 shows yet another embodiment of a system 500 with a master device 510, such as a microcontroller MC having an serial two wire interface 530 according to various embodiments. Again, this serial interface combines synchronous and asynchronous transmission protocols to form a new serial protocol according to various embodiments. The synchronous portion of this protocol may operate similar to an I²C protocol. However, any other suitable serial protocol can be used. The two wire interface 530 connects the microcontroller 510 with an OOK transmitter 520 having a low pin count housing, in this example an 8-pin housing which including a serial interface according to various embodiments. However, other low pin count housings such as a 6-pin or other low pin number may be used. For example, a 5-pin housing may be used if the oscillator is fully integrated and does not require an external connection.

Driver/Modulator stage 420 outputs the radio frequency signal at pin RFO. An ON-OFF modulation signal as discussed above may be directly derived from the serial data signal and fed via controllable switch 440 to the driver/modulator stage 420. Interface/Control Unit 430 is coupled with the clock and data pins SCK, SDI and may be configured to store configuration and calibration settings. To this end, a configuration/calibration bus 450 may be implemented that allows control of certain parameters of the oscillator circuit 410 and/or driver/modulator stage 420. Instead of a bus 450 dedicated control lines may be used.

When implemented in an OOK transmitter device in a low pin count housing, the master device controlling such a low pin count device via the serial interface according to various embodiments needs a very simple way to turn on/off the transmitter in such a device, to achieve low power consumption. As described above, the master will configure, control and send transmit data to the device through the two-wire interface implementing the protocol according to various embodiments. As discussed above, in a simple 2-wire serial interface, one data line and one clock line is used. Communication from master to slave may include the sequence "start+command bits+configuration bits+tx data bits+ stop"

according to some embodiments. The "start" on the 2-wire interface will start communication between master and slave, and power on slave device (with delay). The "stop" on the 2-wire interface will stop communication, power off slave device. The "command bits" will set a slave device operation mode; "command bits" are synchronous to the clock line to simplify the slave interface logic. The "configuration bits" will configure the slave device wherein "configuration bits" are synchronous to the clock line and can be implemented optional to reduce communication time and slave on-time according to some embodiments. Asynchronous "tx data bits" provide flexibility in data rates, data coding, packet structure and timing.

Figure 1:
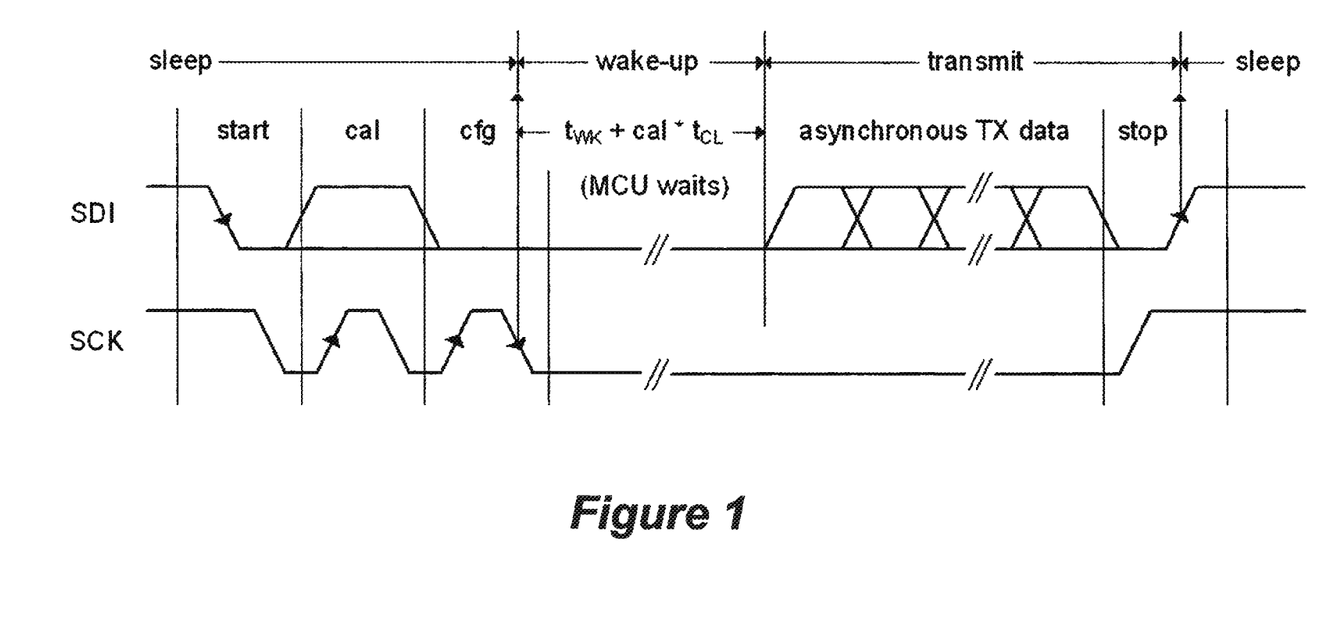
FIG. 1 shows a first typical timing according to a first operating mode.

FIG. 1 shows a first typical timing according to a first operating mode. This mode includes a quick start up without transmitting configuration data. Thus, the default setting or a previously transmitted configuration setting is used. The start pattern can be a predefined pattern as shown in FIG. 1. For example, the start pattern is defined by transitioning the data line from a logic "1" or high state to a logic "0" or low state while the clock signal line is held in a logic "1" or high state. However, other start patterns may be used according to various embodiments. The following "cal" bit may indicate whether a calibration routine should be initiated within the device. Calibration or any other functionality may be optional and depend on the specific function of the slave device. For a OOK transmitter such a calibration function may implemented in a fixed manner or implemented optionally using such a bit. Thus, according to some embodiments, a recalibration (cal=1) may not be needed normally and can therefore be implemented optionally. However, if implemented, such a calibration is initiated by setting the respective bit which allows for a calibration function to be activated within the slave device. The calibration could, for example, be performed during a wake-up of the device. As shown in FIG. 1 an additional configuration bit time slot "cfg" is provided. In the signal example shown in FIG. 1, this bit has not been set and will therefore be explained in more detail with respect to FIG. 2. Other control bits may be implemented in the start sequence as will be appreciated by a person skilled in the art.

Upon receiving the start pattern and the following two bits in this specific embodiment, the slave device may require a certain number cycles or a certain wait time for "waking-up". In other words, the master device may be required to wait for a certain time period before actual asynchronous data can be sent. The time slot "transmit" includes the asynchronous transmission of data on the data line while the clock line is held in a predefined logic state, for example in a logic "0" or low state. However, a logic "1" or high can be used if the start and stop patterns are selected accordingly. During the main time period of the "transmit-" slot, data that defines the on-off function of the transmitter is used to modulate the on-off function of the transmitter. FIG. 1 further shows that the end of the "transmit-" slot is defined by a predefined stop pattern. In this embodiment, the stop pattern is defined by setting one line in a logic "1" or high state while transitioning the other line from a logic "0" or low state to a logic "1" or high state. Upon reception of this stop pattern, the slave device can be switched into a low power or sleep mode in which it may wait for the next start pattern to be activated again. Internal configuration states may be kept in non-volatile registers or memory according to some embodiments. Thus, configuration may only be required once.

Figure 2:
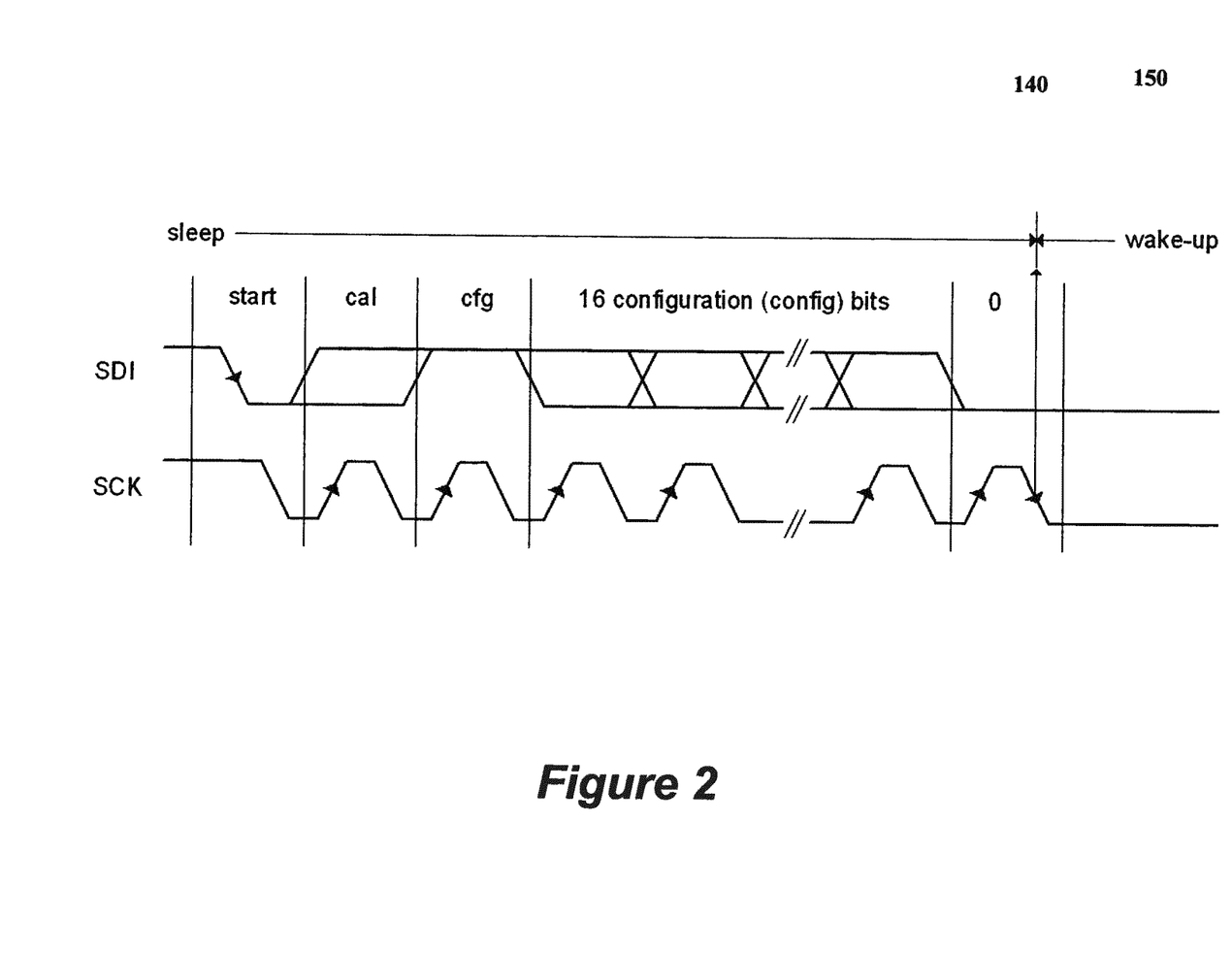
FIG. 2 shows a second typical timing according to a second operating mode.

FIG. 2 shows another signal sequence in which configuration data are transmitted. Such a transmission starts with configuration settings update. According to some embodiments, a recalibration may or may not be needed. For example, some embodiments may need a recalibration in case of a frequency setting change. Thus, the transmission signal sequence may include the setting of calibration bit "cal" or not as indicated in FIG. 1. As discussed above, FIG. 2 shows that the configuration bit "cfg" has been set. Thus, a predefined number of following bits may be used, for example 16 bits as shown in FIG. 2, to configure the device. The slave device may implement a simple counter and shift register as well as associated logic to receive the configuration bits. A variable number of configuration bits may be implemented using a specific end pattern according to some embodiments. Thereafter may follow a wake-up time period. However, the wake-up period may start parallel with reception of the configuration bits. After wake-up, the asynchronous data transmission similar as shown in FIG. 1 may follow.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary.

While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

What is claimed is:

1. A serial transmission method using a two-wire serial interface, comprising:
 coupling a master device with a slave device through the two-wire serial interface, wherein the slave device comprises a first and second external pin coupled with an interface control unit configured to decode signals transmitted through the two-wire serial interface and an analog functional unit having a modulator input generating an output signal on a third external pin of the slave device; and performing the steps of:
  operating the two-wire serial interface as a synchronous serial interface, wherein a first wire is operated as a data signal wire and a second wire as a clock signal wire;
  transmitting by the master device a first synchronous serial signal via said two-wire serial interface, wherein the interface control unit of the slave device receives the first synchronous serial signal and is configured to wake-up the slave device and to directly connect one of the first or second wire with the functional unit; and
  thereafter transmitting by the master device an asynchronous data signal on the one of the first or the second wire of the two-wire serial interface, wherein the logic states of the asynchronous data signal directly modulate an analog output signal at the third external pin of the slave device.

2. The method according to claim 1, wherein the synchronous serial signal comprises configuration data for the slave device and wherein the interface control unit of the slave device decodes said configuration data.

3. The method according to claim 1, wherein the synchronous serial signal comprises a calibration request and wherein the interface control unit of the slave device decodes said calibration request.

4. The method according to claim 1, wherein the slave device comprises a radio frequency transmitter.

5. The method according to claim 4, wherein the functional unit is an on-off-key (OOK) radio frequency transmitter.

6. The method according to claim 5, wherein the asynchronous data signal turns the transmitter on or off, respectively according to its logic state.

7. The method according to claim 1, wherein a communication via said two-wire serial interface comprises a start pattern followed by an asynchronous data transmission followed by a stop pattern.

8. The method according to claim 7, wherein the communication further comprises a wake-up wait period.

9. The method according to claim 7, wherein the communication further comprises a configuration bit within said synchronous signal.

10. The method according to claim 9, wherein when said configuration bit is set the communication comprises synchronous configuration data.

11. The method according to claim 7, wherein the communication further comprises a calibration bit within said synchronous signal.

12. The method according to claim 11, wherein when said calibration bit is set the slave device will perform a calibration.

13. A system comprising a master device and a slave device coupled through a two-wire serial interface comprising a signal line and a clock line coupled first and second external pins of the slave device, wherein the master device is configured to control the slave device by controlling the two-wire serial interface to operate in a synchronous mode and to transmit a synchronous serial data signal via said two-wire serial interface to wake-up the slave device, wherein the slave device comprises a switch which after waking up the slave device is controlled to couple the one of the two-wires of the two-wire serial interface with an input of a modulator wherein the logic states of a data signal on the one of the two-wires of the two-wire serial interface directly modulates an analog function of the slave device.

14. The system according to claim 13, wherein the slave device is an on-off-key (OOK) radio frequency transmitter coupled with a third external pin of the slave device, wherein the data signal on the one of the two-wires of the two-wire serial interface turns the transmitter on or off, respectively according to its logic state.

15. The system according to claim 13, wherein a communication via said two-wire serial interface comprises a start pattern followed by a data transmission on the one of the two-wires of the two-wire serial interface followed by a stop pattern.

16. The system according to claim 13, wherein the communication further comprises a wake-up wait period.

17. The system according to claim 13, wherein the communication further comprises a configuration bit within said synchronous signal.

18. The system according to claim 17, wherein when said configuration bit is set the communication comprises synchronous configuration data.

19. The system according to claim 13, wherein the communication further comprises a calibration bit within said synchronous signal.

20. The system according to claim 19, wherein when said calibration bit is set the slave device will perform a calibration.

21. An integrated circuit device comprising:
  a two wire serial interface coupled with a first and a second external pin of the integrated circuit device,
  a switch coupled with the first external pin,
  a control unit coupled with said two-wire serial interface and configured to decode synchronous transmission data and to control said switch, and
  a functional unit coupled with said switch and with a third external pin of the integrated circuit device and being controlled by the control unit, wherein the control unit is operable to receive a first synchronous serial signal via said two-wire serial interface to wake-up the integrated circuit device and thereafter to control the switch to couple the first external pin with the functional unit, wherein the logic states of a data signal at the first pin directly control the functional unit of the integrated circuit device, wherein an analog signal which is directly modulated by said data signal is output at the third external pin.

22. The integrated circuit device according to claim 21, wherein the integrated circuit device is an on-off-key (OOK) radio frequency transmitter, wherein the data signal at the first pin turns the transmitter on or off, respectively according to its logic state.

23. The integrated circuit device according to claim 21, wherein a communication received via said two-wire serial interface comprises a start pattern followed by said data signal followed by a stop pattern.

24. The integrated circuit device according to claim 21, wherein the communication further comprises a wake-up wait period during which the operational units of integrated circuit device are woken up from a sleep mode by said control unit.

25. The integrated circuit device according to claim 21, wherein the communication further comprises a configuration bit within said synchronous signal.

26. The integrated circuit device according to claim 25, wherein when said configuration bit is set the communication comprises synchronous configuration data.

27. The integrated circuit device according to claim 21, wherein the communication further comprises a calibration bit within said synchronous signal.

28. The integrated circuit device according to claim 27, wherein when said calibration bit is set the integrated circuit device will perform a calibration.

29. The integrated circuit device according to claim 21, wherein the IC device is arranged within a 6-pin housing.

* * * * *